United States Patent
Eguchi et al.

(10) Patent No.: US 9,435,411 B2
(45) Date of Patent: Sep. 6, 2016

(54) ELECTRIC LINEAR MOTION ACTUATOR AND ELECTRIC DISK BRAKE SYSTEM

(75) Inventors: Masaaki Eguchi, Iwata (JP); Makoto Muramatsu, Iwata (JP); Tatsuya Yamasaki, Iwata (JP); Makoto Yasui, Iwata (JP)

(73) Assignee: NTN CORPORATION, Osaka (JP)

( * ) Notice: Subject to any disclaimer, the term of this patent is extended or adjusted under 35 U.S.C. 154(b) by 56 days.

(21) Appl. No.: 13/980,070

(22) PCT Filed: Jan. 12, 2012

(86) PCT No.: PCT/JP2012/050441
§ 371 (c)(1),
(2), (4) Date: Jul. 17, 2013

(87) PCT Pub. No.: WO2012/098977
PCT Pub. Date: Jul. 26, 2012

(65) Prior Publication Data
US 2013/0292215 A1    Nov. 7, 2013

(30) Foreign Application Priority Data

Jan. 21, 2011 (JP) ................. 2011-010642

(51) Int. Cl.
*F16D 55/22* (2006.01)
*F16H 25/12* (2006.01)
(Continued)

(52) U.S. Cl.
CPC ............. *F16H 25/12* (2013.01); *F16C 19/305* (2013.01); *F16C 23/084* (2013.01);
(Continued)

(58) Field of Classification Search
CPC .. F16D 55/08; F16D 55/226; F16D 2125/40; F16H 25/2266; F16H 25/12; F16H 25/2252
USPC ............. 188/72.8, 156, 157, 158, 161, 162; 74/89.23, 89.29, 89.3, 89.31, 424.71, 74/424.81, 424.89, 424.91, 424.92; 475/149, 150
See application file for complete search history.

(56) References Cited

U.S. PATENT DOCUMENTS 3,393,574 A * 7/1968 Roantree ..................... 74/424.7
4,366,726 A * 1/1983 Nilsson ........................ 475/163
(Continued)

FOREIGN PATENT DOCUMENTS

| JP | 34-1807 | 4/1959 |
| JP | 53-152040 | 11/1978 |

(Continued)

OTHER PUBLICATIONS

International Search Report issued Apr. 3, 2012 in International (PCT) Application No. PCT/JP2012/050441.
(Continued)

*Primary Examiner* — Thomas Irvin
(74) *Attorney, Agent, or Firm* — Wenderoth, Lind & Ponack, L.L.P.

(57) ABSTRACT

A linear motion actuator includes an outer ring member mounted in a housing, a rotary shaft rotated by a motor, planetary rollers mounted between the outer ring member and the shaft and supported by a carrier rotatable about the shaft. A helical rib is formed on the inner surface of the outer ring member which is engaged in helical grooves formed in outer surfaces of the planetary rollers. When the shaft rotates, the planetary rollers rotate and revolve, thereby axially moving the outer ring member. Uneven axial loads applied to the planetary rollers from the outer ring member are supported by thrust bearings disposed between the planetary rollers and an inner disk of the carrier. Aligning seats are provided between each opposed pair of the planetary rollers and the thrust bearings such that the contact surfaces of the aligning seats shift relative to each other under the uneven axial loads.

2 Claims, 14 Drawing Sheets

(51) Int. Cl.
*F16H 25/22* (2006.01)
*F16D 65/18* (2006.01)
*F16D 55/226* (2006.01)
*F16C 19/30* (2006.01)
*F16C 23/08* (2006.01)
*F16D 121/24* (2012.01)
*F16D 125/40* (2012.01)
*F16D 125/48* (2012.01)
*F16D 125/58* (2012.01)

(52) U.S. Cl.
CPC ........... *F16D 55/226* (2013.01); *F16D 65/18* (2013.01); *F16H 25/2252* (2013.01); *F16H 25/2266* (2013.01); *F16D 2121/24* (2013.01); *F16D 2125/40* (2013.01); *F16D 2125/48* (2013.01); *F16D 2125/587* (2013.01); *Y10T 74/18576* (2015.01)

(56) References Cited

U.S. PATENT DOCUMENTS

| | | | | |
|---|---|---|---|---|
| 4,428,437 | A * | 1/1984 | Steinberg | 172/547 |
| 4,521,707 | A * | 6/1985 | Baker | 310/80 |
| 4,804,073 | A * | 2/1989 | Taig et al. | 188/72.1 |
| 4,850,457 | A * | 7/1989 | Taig | 188/72.1 |
| 4,865,162 | A * | 9/1989 | Morris et al. | 188/72.8 |
| 5,098,359 | A * | 3/1992 | Chales et al. | 475/347 |
| 5,336,137 | A * | 8/1994 | Kawakita | 475/347 |
| 5,829,315 | A * | 11/1998 | Polowchak et al. | 74/527 |
| 6,098,479 | A * | 8/2000 | Hoermansdoerfer | 74/424.92 |
| 6,315,459 | B1 * | 11/2001 | Takano et al. | 384/572 |
| 6,405,836 | B1 * | 6/2002 | Rieth et al. | 188/72.1 |
| 6,536,561 | B1 * | 3/2003 | Keller | 188/71.8 |
| 6,554,109 | B1 * | 4/2003 | Olschewski et al. | 188/72.8 |
| 7,552,782 | B1 * | 6/2009 | Sexton et al. | 175/107 |
| 8,376,094 | B2 * | 2/2013 | Yamasaki et al. | 188/72.8 |
| 8,579,090 | B2 * | 11/2013 | Yamasaki | 188/72.8 |
| 8,596,426 | B2 * | 12/2013 | Yamasaki et al. | 188/162 |
| 8,794,395 | B2 * | 8/2014 | Yamasaki et al. | 188/72.1 |
| 2004/0116218 | A1 * | 6/2004 | Butsch et al. | 474/8 |
| 2004/0244520 | A1 * | 12/2004 | Cornelius et al. | 74/424.92 |
| 2005/0160856 | A1 * | 7/2005 | Sugitani | 74/424.92 |
| 2008/0159667 | A1 * | 7/2008 | Michioka et al. | 384/13 |
| 2009/0095579 | A1 * | 4/2009 | Yamasaki | 188/72.7 |
| 2010/0320043 | A1 * | 12/2010 | Yamasaki et al. | 188/162 |
| 2011/0247904 | A1 | 10/2011 | Yamasaki | |
| 2012/0305344 | A1 * | 12/2012 | Yamasaki et al. | 188/72.1 |
| 2013/0048443 | A1 * | 2/2013 | Muramatsu et al. | 188/72.1 |
| 2013/0168192 | A1 * | 7/2013 | Yasui et al. | 188/72.1 |
| 2013/0186717 | A1 * | 7/2013 | Muramatsu et al. | 188/72.1 |
| 2013/0312555 | A1 * | 11/2013 | Yamasaki | 74/89.34 |

FOREIGN PATENT DOCUMENTS

| | | |
|---|---|---|
| JP | 11-46467 | 2/1999 |
| JP | 2010-065777 | 3/2010 |
| JP | 2010-090959 | 4/2010 |

OTHER PUBLICATIONS

Japanese Office Action issued May 12, 2015 in corresponding Japanese Patent Application JP 2014-160412 (with partial English translation).

\* cited by examiner

Fig. 14(a)
Fig. 14(b)
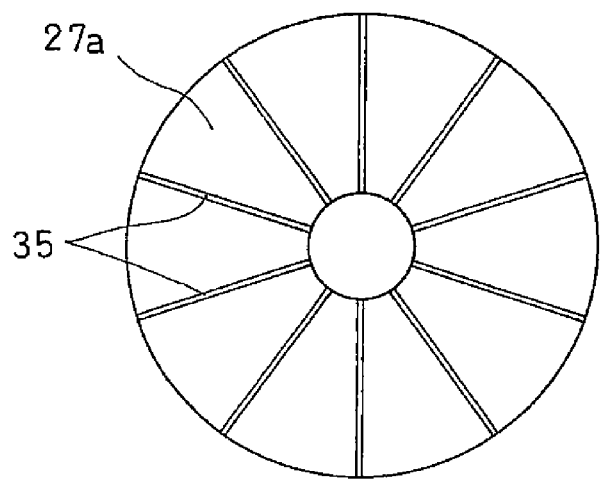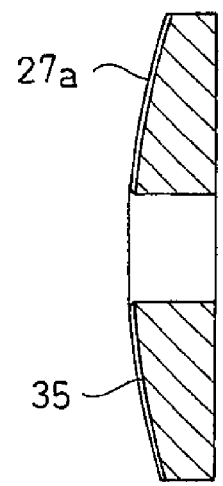
Fig. 15(a)
Fig. 15(b)
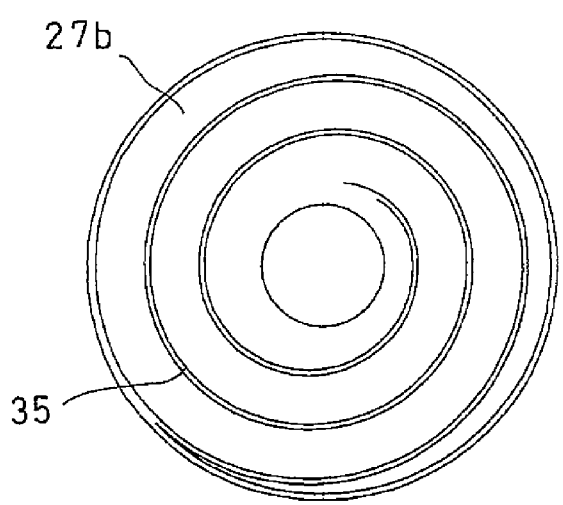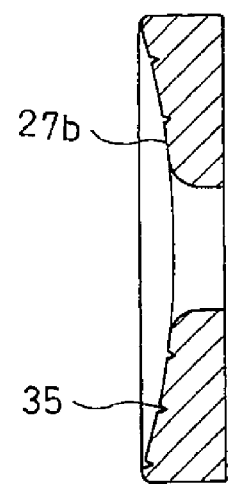

ELECTRIC LINEAR MOTION ACTUATOR AND ELECTRIC DISK BRAKE SYSTEM

TECHNICAL FIELD

This invention relates to an electric linear motion actuator for linearly driving a driven member such as a brake pad, and an electric disk brake system including such an electric linear motion actuator.

BACKGROUND ART

An electric linear motion actuator driven by an electric motor includes a motion converter mechanism for converting the rotary motion of the rotor shaft of the electric motor to a linear motion of an axially movable supported driven member.

Known such motion converter mechanisms include a ball-screw mechanism and a ball-ramp mechanism. While these known motion converter mechanisms can increase power to some extent, they cannot increase power to a level necessary in an electric disk brake system.

Thus, if such a conventional motion converter mechanism is used in an electric linear motion actuator, it is necessary to additionally provide the actuator with a speed reduction mechanism such as a planetary gear mechanism to increase driving power. The addition of such a speed reduction mechanism leads to increased complexity and size of the electric linear motion actuator.

In order to avoid this problem, the applicant of this invention proposed, in JP Patent Publication 2010-65777A and JP Patent Publication 2010-90959A, electric linear motion actuators which are suitable for use in electric disk brake systems because they can increase power to a considerable degree without the need for a speed reduction mechanism, and are small in linear motion stroke.

Either of the electric linear motion actuators disclosed in JP Patent Publication 2010-65777A and JP Patent Publication 2010-90959A includes a rotary shaft rotated by an electric motor, an axially movable outer ring member, and planetary rollers mounted between the rotary shaft and the outer ring member. When the rotary shaft is rotated, the planetary rollers are rotated about their respective own axes while revolving around the rotary shaft, due to frictional contact with the rotary shaft. This causes the outer ring member to move linearly in the axial direction because a helical rib formed on the radially inner surface of the outer ring member is engaged in helical grooves or circumferential grooves formed in the radially outer surfaces of the planetary rollers.

Either of the electric linear motion actuators disclosed in JP Patent Publication 2010-65777A and JP Patent Publication 2010-90959A further includes thrust bearings mounted between the respective planetary rollers and an inner disk of a carrier rotatably supporting the planetary rollers. The thrust bearings allow smooth rotation of the planetary rollers when axial loads are applied to the planetary rollers from the outer ring member.

In either of the electric linear motion actuators disclosed in JP Patent Publication 2010-65777A and JP Patent Publication 2010-90959A, axial loads from the outer ring member are applied to each planetary roller at its portion where the helical groove or circumferential grooves are in engagement with the helical rib of the outer ring member. Thus such axial loads are unevenly applied to the planetary rollers and thus such uneven loads are applied to the respective thrust bearings too.

As a result, a large axial load is applied to a rolling element of each thrust bearing that is axially aligned with the portion of the corresponding planetary roller where axial loads are applied, and a smaller axial load is applied to a rolling element that is circumferentially farther apart from the first-mentioned rolling element. This results in uneven surface pressure distribution of each thrust bearing in the circumferential direction, increasing the possibility of uneven wear of the rolling elements and the bearing races of the thrust bearings.

SUMMARY OF THE INVENTION

An object of the present invention is to make uniform the circumferential surface pressure distribution of the thrust bearing rotatably supporting each planetary roller.

In order to achieve this object, the present invention provides an electric linear motion actuator comprising a cylindrical housing, an outer ring member mounted in the housing, a rotary shaft extending along a center axis of the outer ring member and configured to be rotated by an electric motor, planetary rollers mounted between a radially outer surface of the rotary shaft and a radially inner surface of the outer ring member, a carrier supported by the rotary shaft so as to be rotatable about the rotary shaft and rotatably supporting the planetary rollers, the carrier including an inner disk, wherein a helical groove or circumferential grooves are formed in a radially outer surface of each of the planetary rollers, and a helical rib is formed on the radially inner surface of the outer ring member, the helical rib being in engagement with the helical grooves or the circumferential grooves of the respective planetary rollers, wherein the rotary shaft is kept in frictional contact with the respective planetary rollers, whereby when the rotary shaft rotates, planetary rollers are configured to rotate about respective axes of the planetary rollers while revolving around the rotary shaft, thereby moving the outer ring member in one axial direction, and thrust bearings mounted between the respective planetary rollers and the inner disk of the carrier and configured to receive an axial force applied to the respective planetary rollers from the outer ring member when the outer ring member is moved in the one axial direction, wherein the actuator further comprises pairs of aligning seats, each pair being provided between each of the planetary rollers and a corresponding one of the thrust bearings or between each of the thrust bearings and the inner disk of the carrier.

The present invention also provides an electric disk brake system comprising an electric linear motion actuator, a brake pad, and a brake disk, wherein the brake pad can be linearly driven by the linear motion actuator and pressed against the brake disk, thereby generating braking force, wherein as this electric linear motion actuator, the electric linear motion actuator according to this invention is used.

In this electric linear motion actuator, when the rotary shaft is rotated by the electric motor, the planetary rollers rotate about their own axes while revolving around the rotary shaft, due to frictional contact between the planetary rollers and the rotary shaft. In this state, since the helical rib formed on the radially inner surface of the outer ring member is engaged in the helical grooves or circumferential grooves formed in the radially outer surfaces of the planetary rollers, the outer ring member is moved linearly in the axial direction.

Thus, by connecting the brake pad of the electric disk brake system to the outer ring member, it is possible to linearly drive the brake pad to press the brake pad against the brake disk, thereby applying a braking force to the brake disk.

While applying a braking force, axial loads are applied to the planetary rollers from the outer ring member. Since such axial loads act on the portions of the helical grooves or circumferential grooves formed on the radially outer surfaces of the planetary rollers that are in engagement with the helical rib formed on the radially inner surface of the outer ring member, such axial loads are unevenly applied to each planetary roller.

But according to the present invention, since a pair of aligning seats are provided between each planetary roller and each thrust bearing or between each thrust bearing and the inner disk of the carrier, when uneven loads are applied to the planetary rollers, the pressurizing and pressure-receiving ones of the pair of aligning seats shift relative to each other while kept in contact with each other such that the surface pressure distribution becomes uniform in the circumferential direction. As a result, axial loads are applied to the thrust bearing which are equal over the entire circumference thereof. This prevents uneven wear of the rolling elements and the bearing race.

As used herein, the "pressurizing aligning seat" refers to the seat to which axial loads are applied from the planetary roller, and the "pressure-receiving aligning seat" refers to the seat which receives the pressurizing aligning seat.

Each pair of the aligning seats may be a combination of a convex spherical surface and a concave spherical surface, or a combination of a convex spherical surface and concave tapered surface.

If concave spherical surfaces are used, these surfaces have preferably a radius equal to or larger than the radius of the convex spherical surfaces in order to minimize the axial length of the member or members formed with the concave spherical surfaces. If concave tapered surfaces are used, these surfaces have preferably an obtuse taper angle in order to again minimize the axial length of the member or members formed with the tapered surfaces.

At least one of each pair of the aligning seats, i.e. the convex spherical surface and the concave surface is preferably formed with radial grooves or a spiral groove for retaining lubricant, or innumerable minute independent recesses arranged in a random manner to improve slidability between the contact portions of the convex spherical surface and the concave surface, thereby preventing wear or seizure.

In the electric linear motion actuator according to the present invention, each pair of the aligning seats may be formed on the respective opposed surfaces of a pair of seat plates mounted between each planetary roller and the corresponding thrust bearing or between each thrust bearing and the inner disk of the carrier.

Alternatively, the pressurizing aligning seats or the pressure-receiving aligning seats may be formed on the bearing races of the respective thrust bearings, on the inner disk of the carrier, or on the inner end surfaces of the respective planetary rollers, thereby omitting one of each pair of the seat plates. This reduces the number of parts of the entire actuator, making it easier to assemble the actuator and reducing its axial length.

The members formed with the aligning seats may be made of steel or a sintered material. By forming these members by forging or sintering, it is possible to reduce the cost. These members may be subjected to surface treatment to improve durability.

According to the present invention, by the provision of the aligning seats between the respective planetary rollers and thrust bearings or between the respective thrust bearings and the inner disk of the carrier, contact surfaces between the pressurizing aligning seats and the pressure-receiving aligning seats shift relative to each other under uneven loads applied to the planetary rollers from the outer ring member. This allows uniform surface pressure distribution of the thrust bearings rotatably supporting the respective planetary rollers in the circumferential direction, which in turn improves durability of the thrust bearings.

BRIEF DESCRIPTION OF THE DRAWINGS

FIG. 14(a) is a front view of a different seat plate; and FIG. 14(b) is a vertical sectional view of FIG. 14(a).

FIG. 15(a) is a front view of a still different seat plate; and FIG. 15(b) is a vertical sectional view of FIG. 15(a).

DETAILED DESCRIPTION OF THE INVENTION

Figure 1:
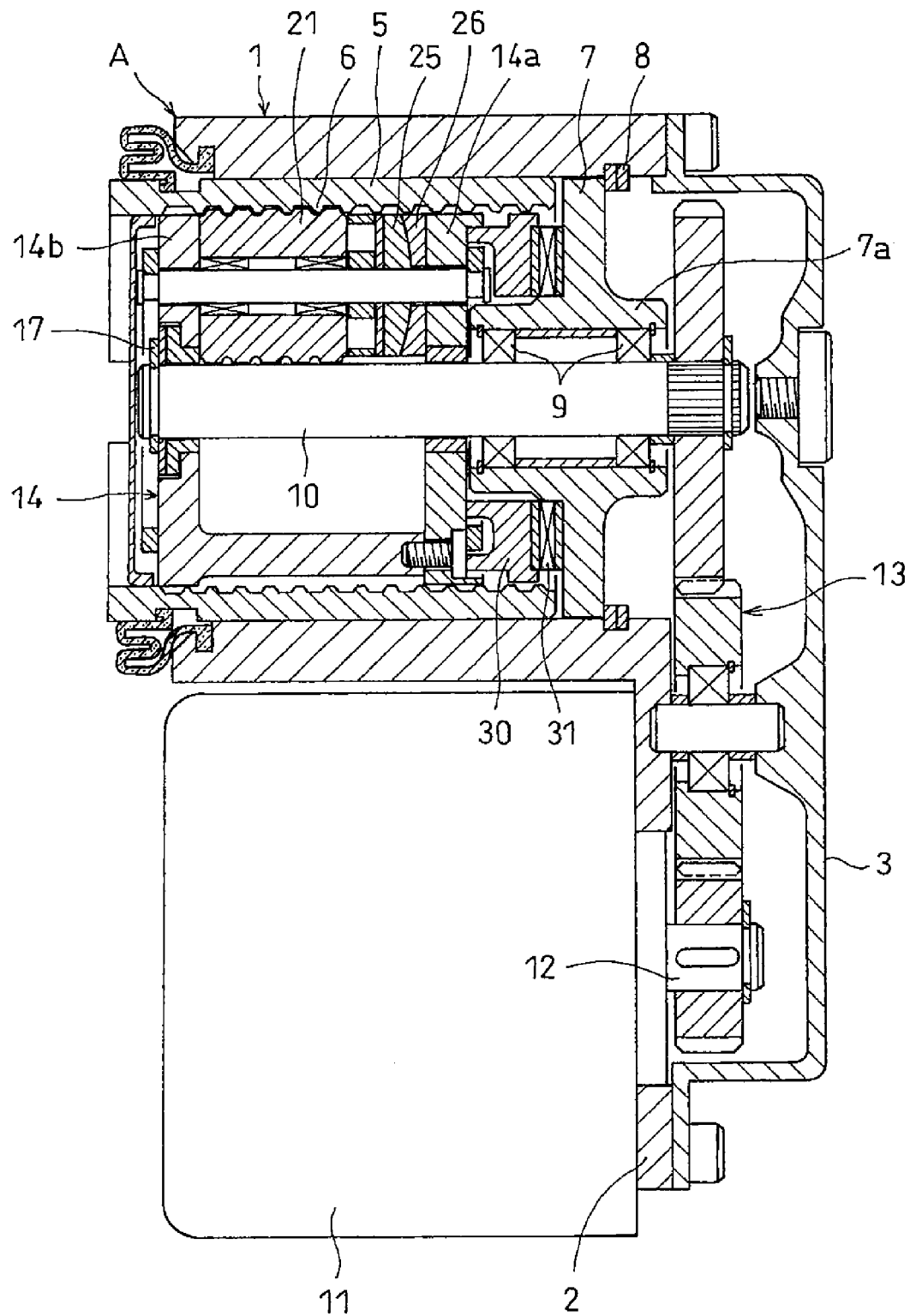
FIG. 1 is a vertical sectional view of an electric linear motion actuator according to a first embodiment of the present invention.
Figure 2:
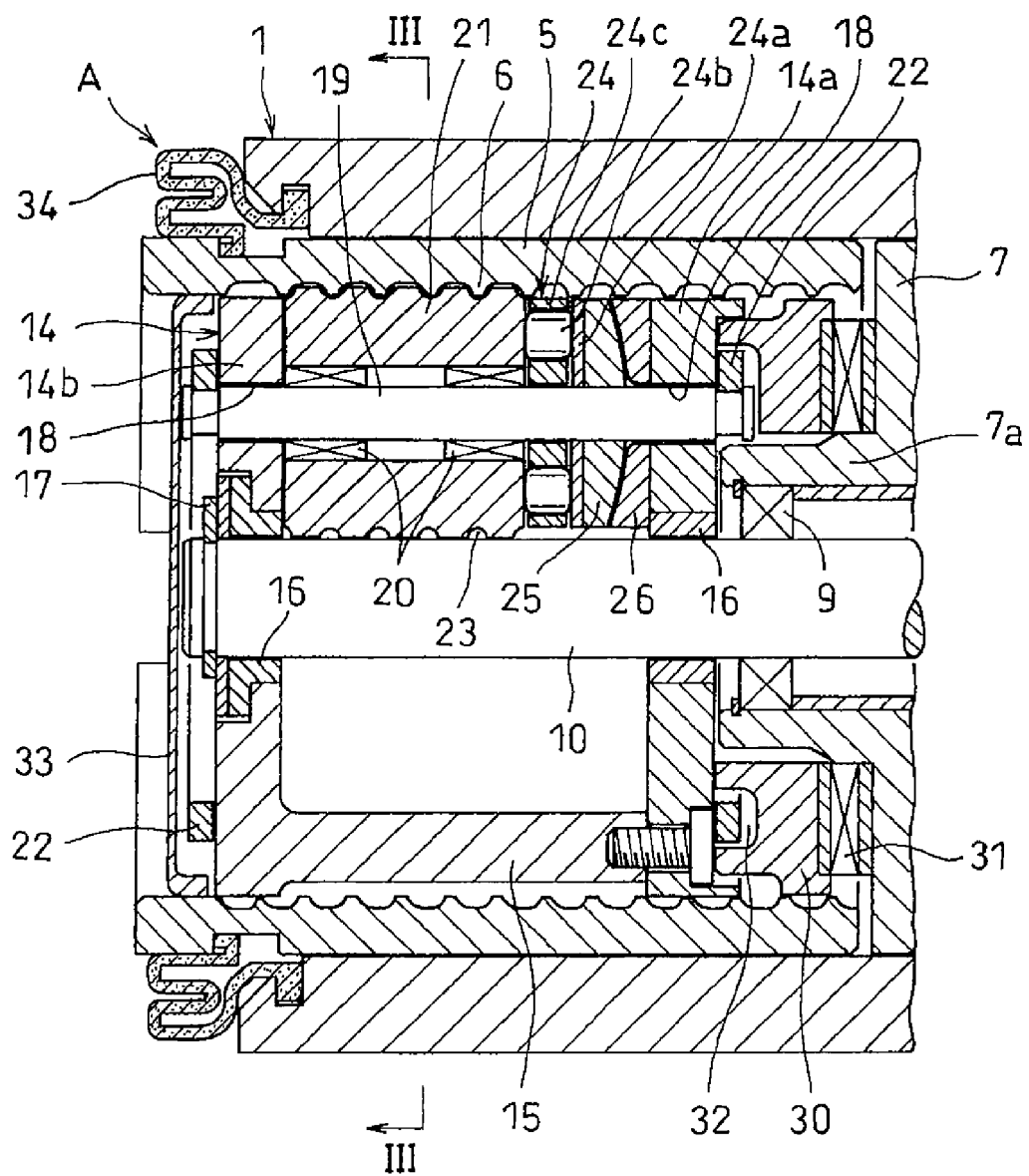
FIG. 2 is an enlarged sectional of a portion of FIG. 1.
Figure 3:
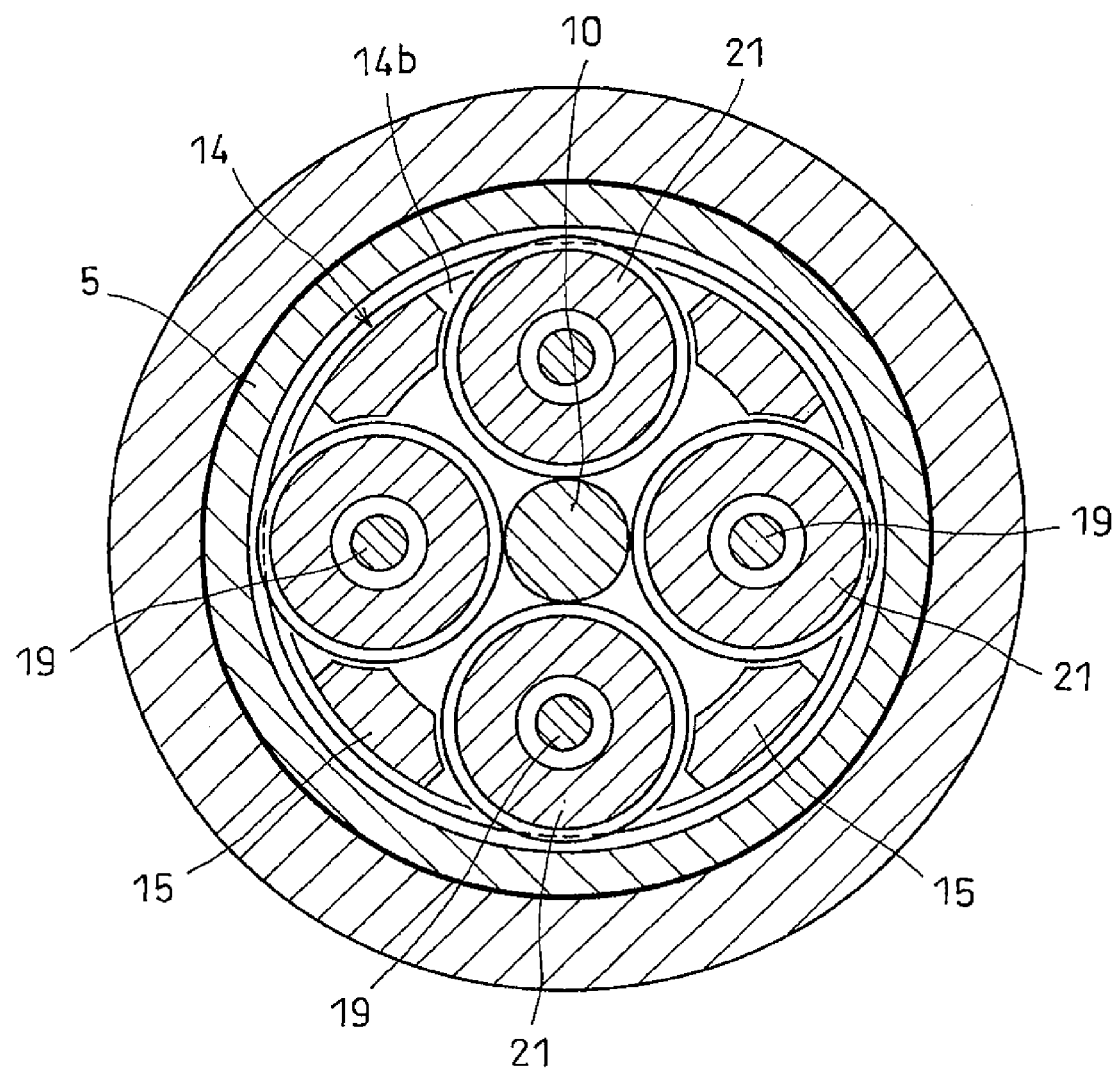
FIG. 3 is sectional view taken along line III-III of FIG. 2.

Now the embodiments of the invention are described with reference to the drawings. FIGS. 1 to 3 show the electric linear motion actuator A according to the first embodiment of the present invention, which includes, as shown in FIG. 1, a cylindrical housing 1 having a radially outwardly extending base plate 2 at a first end thereof. The outer side surface of the base plate 2 is covered by a cover 3 bolted to the first end of the housing 1.

An outer ring member 5 is mounted in the housing 1. The outer ring member 5 is rotationally fixed to the housing, but is axially slidable along the radially inner surface of the housing 1. As shown in FIG. 2, a helical rib 6 having a V-shaped section is formed on the radially inner surface of the housing 1.

As shown in FIG. 1, a bearing member 7 is mounted in the housing 1 at the first axial end of the outer ring member 5. The bearing member 7 is a disk-shaped member having a boss 7a at its central portion. A snap ring 8 is fitted on the radially inner surface of the housing 1, preventing movement of the bearing member 7 toward the cover 3.

A pair of axially spaced apart rolling bearings 9 are mounted in the boss 7a of the bearing member 7. The rolling bearings 9 rotatably support a rotary shaft 10 extending along the center axis of the outer ring member 5.

An electric motor 11 is supported on the base plate 2 of the housing 1 so that the rotation of the rotor shaft 12 of the electric motor 11 is transmitted to the rotary shaft 10 through a reduction gear train 13 mounted in the cover 3.

A carrier 14 is mounted in the outer ring member 5 which is rotatable about the rotary shaft 10. As shown in FIGS. 2 and 3, the carrier 14 includes a pair of axially opposed disks 14a and 14b. The disk 14b carries a plurality of spacer pillars 15 keeping a constant axial distance between the disks 14a and 14b.

The carrier 14 is supported by slide bearings mounted in the radially inner surfaces of the pair of disks 14a and 14b, respectively, so as to be rotatable about the rotary shaft 10 and axially slidable. A snap ring 17 is fitted on the rotary shaft 10 at its end, preventing separation of the carrier 14 from the end of the rotary shaft 10.

The disks 14a and 14b of the carrier 14 are each formed with a plurality of circumferentially spaced apart shaft inserting holes 18 axially aligned with the respective holes 18 formed in the other of the disks 14a and 14b. A roller shaft 19 has its ends inserted in each axially opposed pair of shaft inserting holes 18, respectively. Each roller shaft 19 carries an opposed pair of bearings 20 rotatably supporting a planetary roller 21.

The shaft inserting holes 18 formed in the disks 14a and 14b are radially elongated holes such that the roller shafts 19 can move between the ends of the respective holes 18. Radially elastically deformable elastic rings 22 are wrapped around first and second end portions of the roller shafts 19, respectively, thereby radially inwardly biasing the roller shafts 19 so as to be pressed against the radially outer surface of the rotary shaft 10. Thus, when the rotary shaft 10 rotates, the planetary rollers 21 rotate too because the planetary rollers 21 are in frictional contact with the radially outer surface of the rotary shaft 10.

The planetary rollers 21 are each formed with a helical groove 23 in its radially outer surface which is equal in pitch to the helical rib 6 of the outer ring member 5 and in which the helical rib 6 is engaged. Instead of such a helical groove 23, a plurality of circumferential grooves may be formed with the same pitch as the pitch of the helical rib 6.

Between each planetary roller 21 and the axially inner one of the pair of disks 14a and 14b, i.e. the disk 14a, which is located near the bearing member 7, a thrust bearing 24, a pressurizing seat plate 25 and a pressure-receiving seat plate 26 are arranged in this order from the planetary roller 21 toward the disk 14a.

Figure 4:
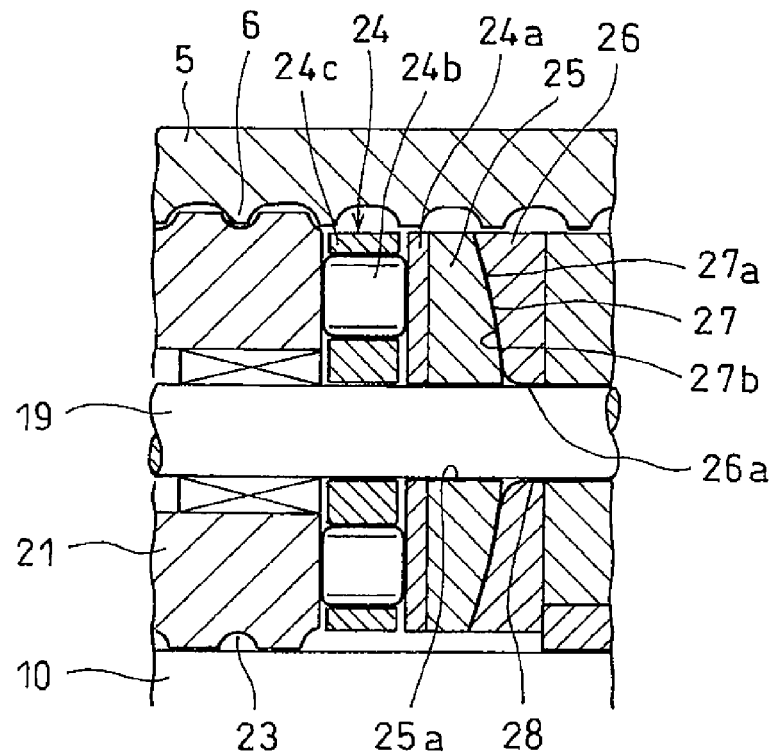
FIG. 4 is an enlarged sectional view of a portion of FIG. 2.

As shown in FIG. 4, the thrust bearing 24 includes a bearing race 24a, a plurality of rolling elements 24b which can roll along the surfaces of the bearing race 24a and the planetary roller 21 opposed to each other, and a retainer 24c retaining the rolling elements 24b.

Figure 5A:
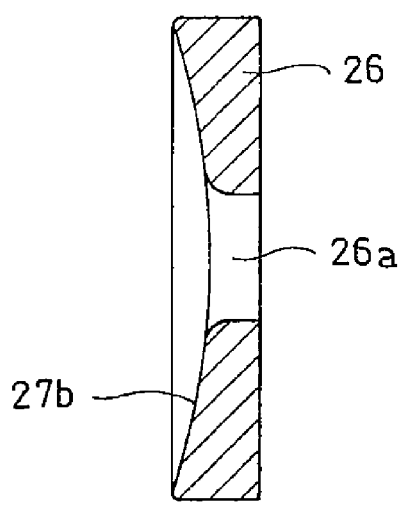
FIGS. 5(a) and 5(b) are sectional views of different seat plates formed with different concave surfaces.
Figure 5B:
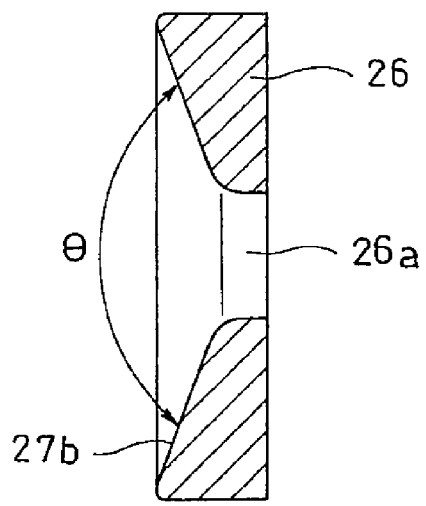

Aligning seats 27 are formed on the respective opposed surfaces of the pressurizing seat plate 25 and the pressure-receiving seat plate 26. The aligning seats 27 include a convex spherical surface 27a formed on the pressurizing seat plate 25 and a concave surface 27b formed on the pressure-receiving seat plate 26 and adapted to contact and guide the convex spherical surface 27a. The concave surface 27b may be a concave spherical surface as shown in FIG. 5(a), or may be a tapered surface as shown in FIG. 5(b).

The pressurizing seat plate 25 and the pressure-receiving seat plate 26 are formed with shaft inserting holes 25a and 26a at their respective central portions thorough which the roller shaft 19 extends. A gap 28 is present between the shaft inserting hole 26a formed in the pressure receiving seat plate 26 and the roller shaft 19.

The shaft inserting hole 25a formed in the pressurizing seat plate 25 has an inner diameter substantially equal to the outer diameter of the roller shaft 19. The pressurizing seat plate 25 is inclinable within the range permitted by the gap 28.

As shown in FIG. 2, an annular support member 30 and a thrust bearing 31 are mounted between the opposed surfaces of the inner disk 14a of the carrier 14 and the bearing member 7 such that the thrust bearing 31 receives axial thrust loads applied to the carrier 14 and the support member 30.

The support member 30 is formed with an annular groove 32 in its surface facing the inner disk 14a in which the elastic ring 22 is received.

A seal cover 33 is mounted to the outer ring member 5 to close the opening of the outer ring member 5 at the second end of the outer ring member, which is located outwardly of the opening of the housing 1 at the second end of the housing, thereby preventing entry of foreign matter into the outer ring member. A boot 34 is mounted between the second end of the housing 1 and the second end of the outer ring member 5 to close the opening of the housing 1 at the second end of the housing, thereby preventing entry of foreign matter into the housing.

Figure 21:
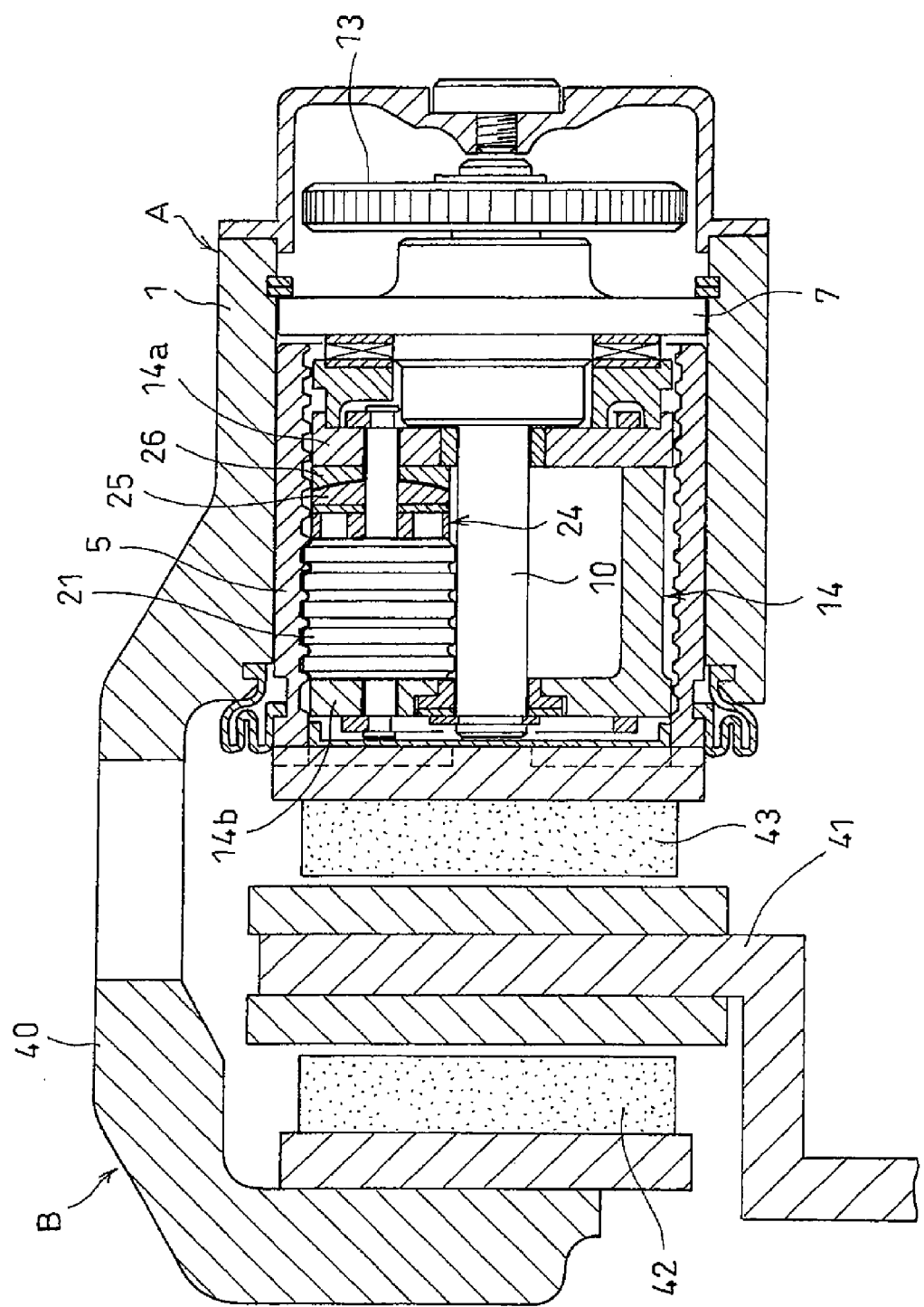
FIG. 21 is a vertical sectional view of an electric disk brake system embodying the present invention.

FIG. 21 shows an electric disk brake system B including the above-described electric linear motion actuator A of the first embodiment. This electric disk brake system includes a caliper body portion 40 integrally connected to the second end of the housing 1 of the electric linear motion actuator, a brake disk 41 arranged such that its outer peripheral portion passes through the interior of the caliper body portion 40, and a fixed brake pad 42 and a movable brake pad 43 provided on one and the other side of the brake disk 41, respectively, with the movable brake pad 43 fixedly coupled to the second end of the outer ring member 5.

Now the operation of the electric disk brake system B shown in FIG. 21 is described. When the rotary shaft 10 is rotated by the electric motor 11, shown in FIG. 1, the planetary rollers 21 rotate about their respective own axes while revolving around the rotary shaft 10, due to frictional contact with the rotary shaft 10.

Since the helical rib 6 formed on the radially inner surface of the outer ring member 5 is engaged in the helical grooves 23 formed in the radially outer surfaces of the respective planetary rollers 21, when the planetary rollers 21 rotate about their respective own axes while revolving around the rotary shaft, the outer ring member 5 moves axially, thus pressing the movable brake pad 43 against the brake disk 41, applying a braking force to the brake disk 41.

When a braking force is applied to the brake disk, axial loads are applied from the outer ring member 5 to the planetary rollers 21. Specifically, such axial loads are applied to the portions of the helical grooves 23 of the planetary rollers 21 that are in engagement with the helical rib 6 of the outer ring member 5. Thus such axial loads are unevenly applied to the respective planetary rollers 21.

Since the pressurizing seat plate 25 and the pressure-receiving seat plate 26 are mounted between each planetary roller 21 and the inner disk 14a of the carrier 14, and the aligning seats 27 are formed on the opposed surfaces of the respective seat plates 25 and 26, when uneven loads are applied to the planetary roller 21, the pressurizing seat plate 25 is inclined with the convex spherical surface 27a of the pressurizing seat plate 25 kept in contact with and guided by the concave surface 27b of the pressure-receiving seat plate 26, thus uniformly distributing the surface pressure between the convex spherical surface 27a and the concave surface 27b in the circumferential direction.

Axial loads are thus evenly applied to the thrust bearing 24 over the entire circumference. This prevents uneven wear of the bearing race 24a and the rolling elements 24b, which in turn improves the durability of the thrust bearing 24.

Figure 6:
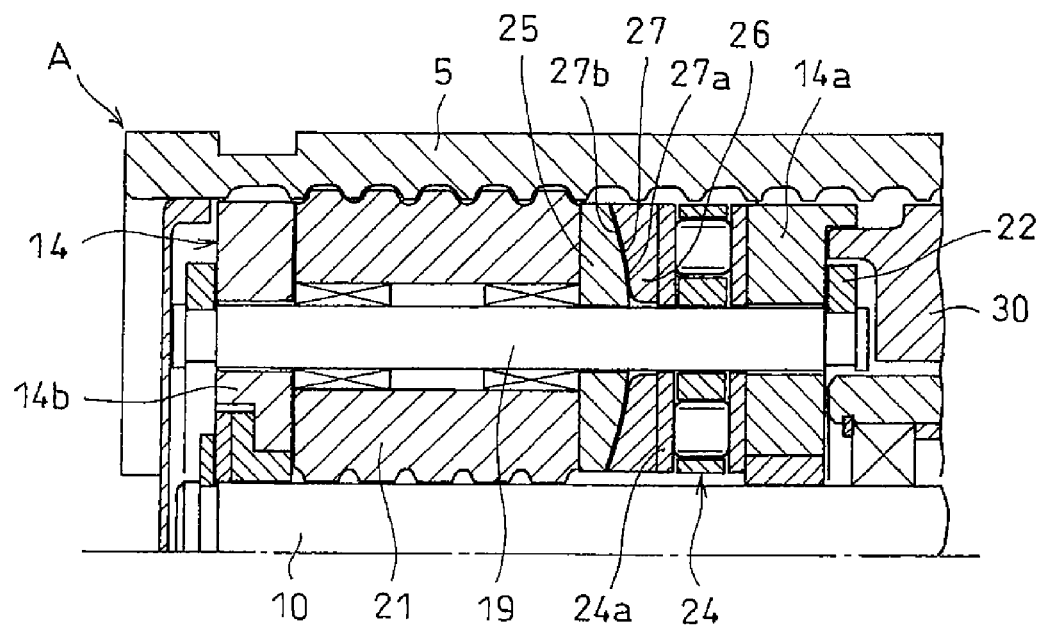
FIG. 6 is a vertical sectional view of an electric linear motion actuator according to a second embodiment of the present invention.

FIG. 6 shows the electric linear motion actuator according to the second embodiment of the present invention. This embodiment differs from the first embodiment in that the pressurizing seat plate 25 and the pressure-receiving seat plate 26 are mounted between each planetary roller 21 and the thrust bearing 24. Thus, elements identical to those of the first embodiment are denoted by the same numerals and their description is omitted.

In the embodiment of FIG. 6, the convex spherical surface 27a is formed on the pressurizing seat plate 25, and the concave surface 27b is formed on the pressure-receiving seat plate 26. In the third embodiment shown in FIG. 7, the concave surface 27b is formed on the pressurizing seat plate 25, while the convex spherical surface 27a is formed on the pressure-receiving seat plate 26.

Figure 7:
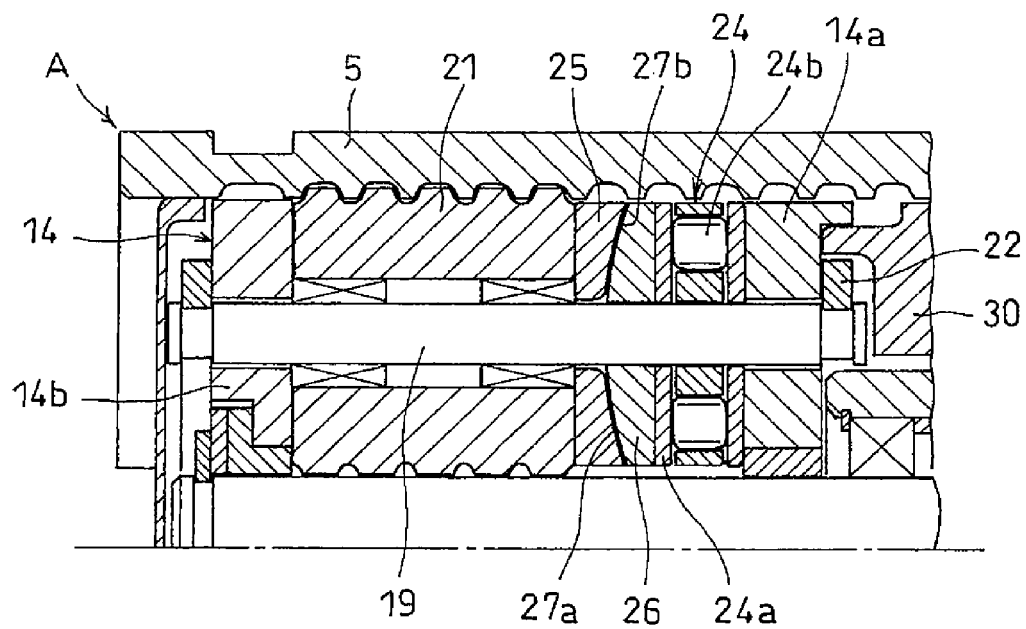
FIG. 7 is a vertical sectional view of an electric linear motion actuator according to a third embodiment of the present invention.

In the second embodiment, shown in FIG. 6, and the third embodiment, shown in FIG. 7, the pressure-receiving seat plates 26 may be each formed with a raceway for guiding the rolling motion of the rolling elements 24b of the respective thrust bearings 24, thereby omitting the bearing races 24a.

Figure 8:
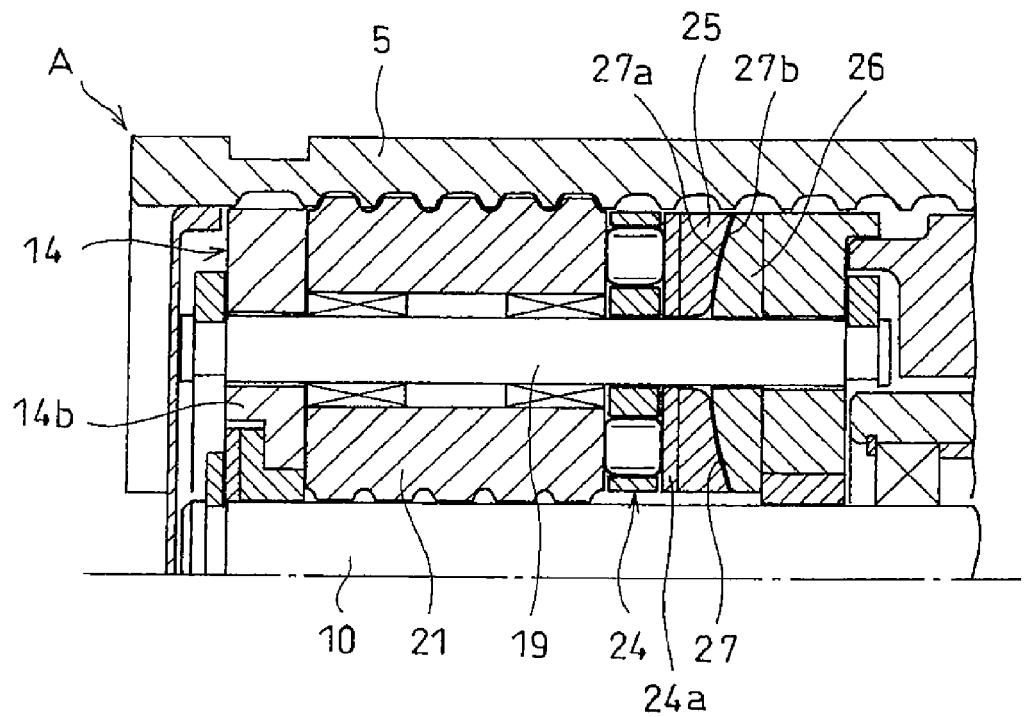
FIG. 8 is a vertical sectional view of an electric linear motion actuator according to a fourth embodiment of the present invention.

FIG. 8 shows the electric linear motion actuator according to the fourth embodiment of the present invention. This embodiment differs from the first embodiment in that a concave spherical surface 27b is formed on the pressurizing seat plate 25, and the convex spherical surface 27a is formed on the pressure-receiving seat plate 26. Thus, elements identical to those of the first embodiment are denoted by the same numerals and their description is omitted.

In any of the electric linear motion actuators of the second to fourth embodiments, when uneven loads are applied to the planetary rollers 21 from the outer ring member 5, the pressurizing seat plates 25 are inclined such that the surface pressure on the thrust bearings 24 is distributed uniformly in the circumferential direction thereof.

In the embodiment of FIG. 8, the pressurizing seat plates 25, which are formed with the concave surfaces 27b, may be formed with raceways for guiding the rolling motion of the rolling elements 24b of the respective thrust bearings 24, thereby omitting the bearing races 24a.

Figure 9:
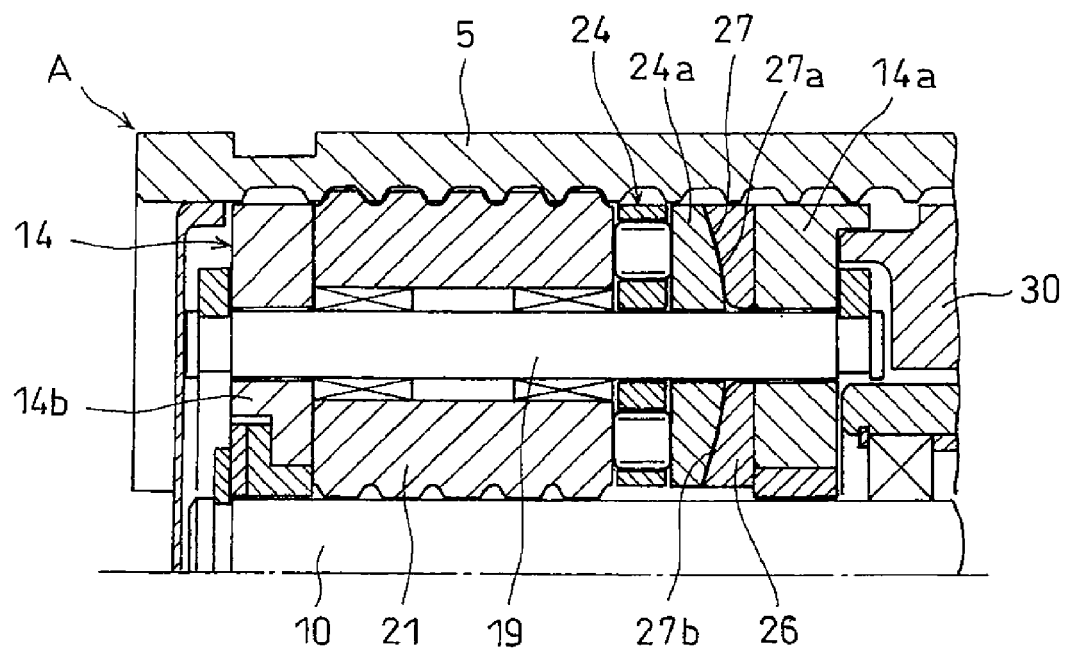
FIG. 9 is a vertical sectional view of an electric linear motion actuator according to a fifth embodiment of the present invention.

FIG. 9 shows the electric linear motion actuator according to the fifth embodiment of the present invention. In this embodiment, the pressure-receiving seat plates 26 are mounted between the bearing races 24a of the respective thrust bearings 24 and the inner disk 14a of the carrier 14, with the convex spherical surfaces 27a formed on the respective bearing races 24a and concave spherical surfaces 27b formed on the respective pressure-receiving seat plates 26 such that the concave surfaces 27b and the convex spherical surfaces 27a serve as the aligning seats 27.

With this arrangement, since the aligning seats 27 are formed on the opposed surfaces of the bearing races 24a and the pressure-receiving seat plates 26, respectively, it is possible to omit the pressurizing seat plates 25, shown in FIG. 2, thus reducing the number of parts, which in turn makes it possible to more easily assemble the electric linear motion actuator and also to reduce its axial length.

Figure 10:
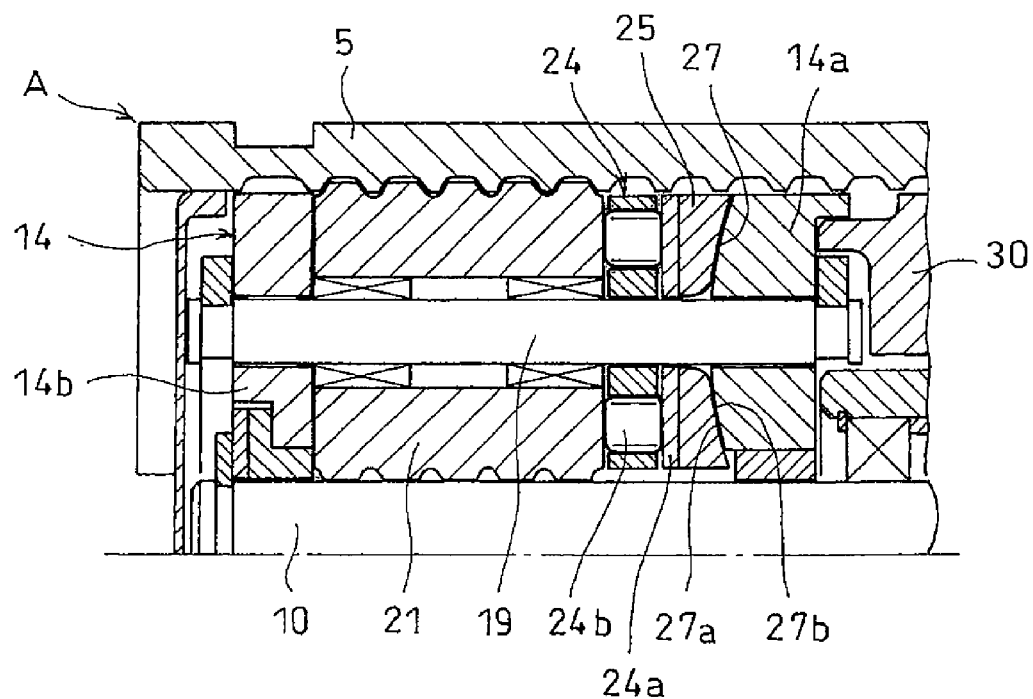
FIG. 10 is a vertical sectional view of an electric linear motion actuator according to a sixth embodiment of the present invention.

FIG. 10 shows the electric linear motion actuator according to the sixth embodiment of the present invention. In this embodiment, the pressurizing seat plates 25 are mounted between the respective thrust bearings 24 and the inner disk 14a of the carrier 14, with concave spherical surfaces 27b formed on the respective pressurizing seat plate 25, and the convex spherical surfaces 27a formed on the inner disk 14a so as to face the respective pressurizing seat plate 25 such that the convex spherical surfaces 27a and the concave surfaces 27b serve as the aligning seats 27.

With this arrangement, since the aligning seats 27 are formed on the opposed surfaces of the respective pressurizing seat plates 25 and the inner disk 14a of the carrier 14, it is possible to omit the pressure-receiving seat plates 26, shown in FIG. 8, thus reducing the number of parts, which in turn makes it possible to more easily assemble the electric linear motion actuator and also to reduce its axial length.

Figure 11:
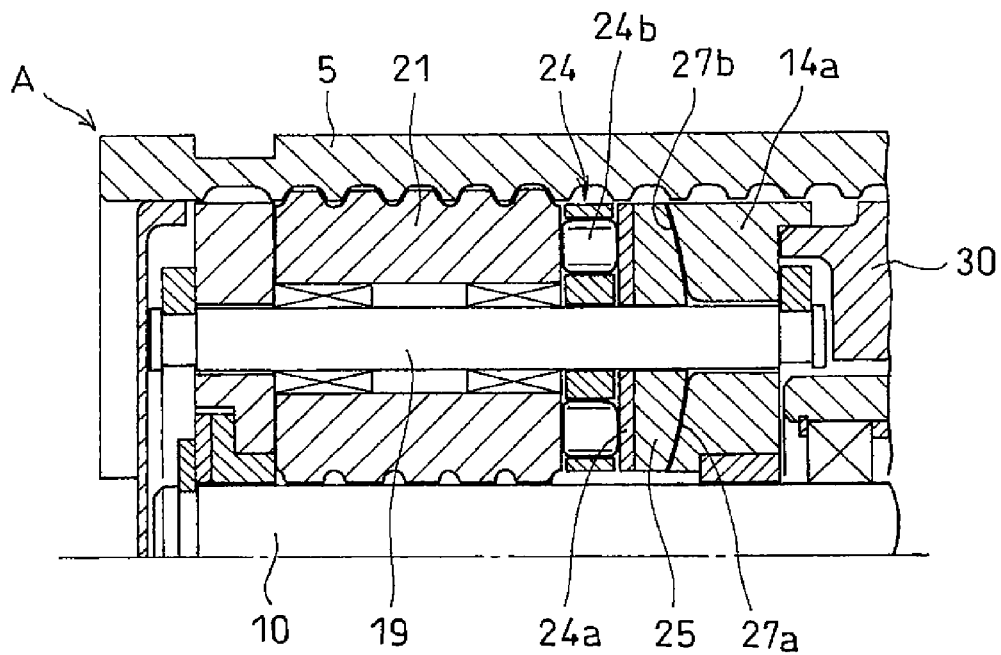
FIG. 11 is a vertical sectional view of an electric linear motion actuator according to a seventh embodiment of the present invention.

Instead of, as in FIG. 10, forming the concave surfaces 27b on the respective pressurizing seat plates 25 and forming the convex spherical surfaces 27a on the inner disk 14a, in the seventh embodiment shown in FIG. 11, the convex spherical surfaces 27a are formed on the respective pressurizing seat plates 25 and the concave surfaces 27b are formed on the inner disk 14a.

In either of the embodiments of FIGS. 10 and 11, the pressurizing seat plates 25 may be formed with raceways for guiding the rolling motion of the rolling elements 24b of the respective thrust bearings 24, thereby omitting the bearing races 24a, shown in FIGS. 10 and 11.

Figure 12:
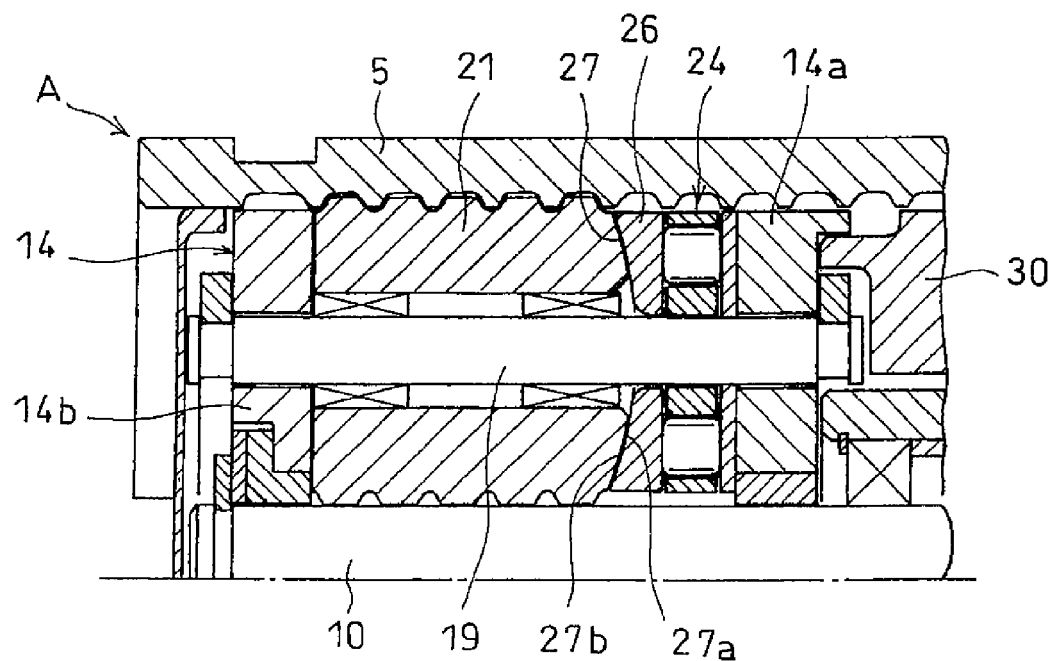
FIG. 12 is a vertical sectional view of an electric linear motion actuator according to an eighth embodiment of the present invention.

FIG. 12 shows the electric linear motion actuator according to the eighth embodiment of the present invention. In this embodiment, the pressure-receiving seat plates 26 are mounted between the respective planetary rollers 21 and the thrust bearings 24, with concave spherical surfaces 27b formed on the surfaces of the respective pressure-receiving seat plates 26 that face the planetary rollers 21, and with the convex spherical surfaces 27a formed on the surfaces of the respective planetary rollers 21 facing the pressure-receiving seat plates 26 such that the convex spherical surfaces 27a and the concave surfaces 27b serve as the aligning seats 27.

With this arrangement, since the aligning seats 27 are formed on the opposed surfaces of the respective planetary rollers 21 and the pressure-receiving seat plates 26, it is possible to omit the pressurizing seat plates 25, shown in FIG. 6, thus reducing the number of parts, which in turn makes it possible to more easily assemble the electric linear motion actuator and also to reduce its axial length.

Figure 13:
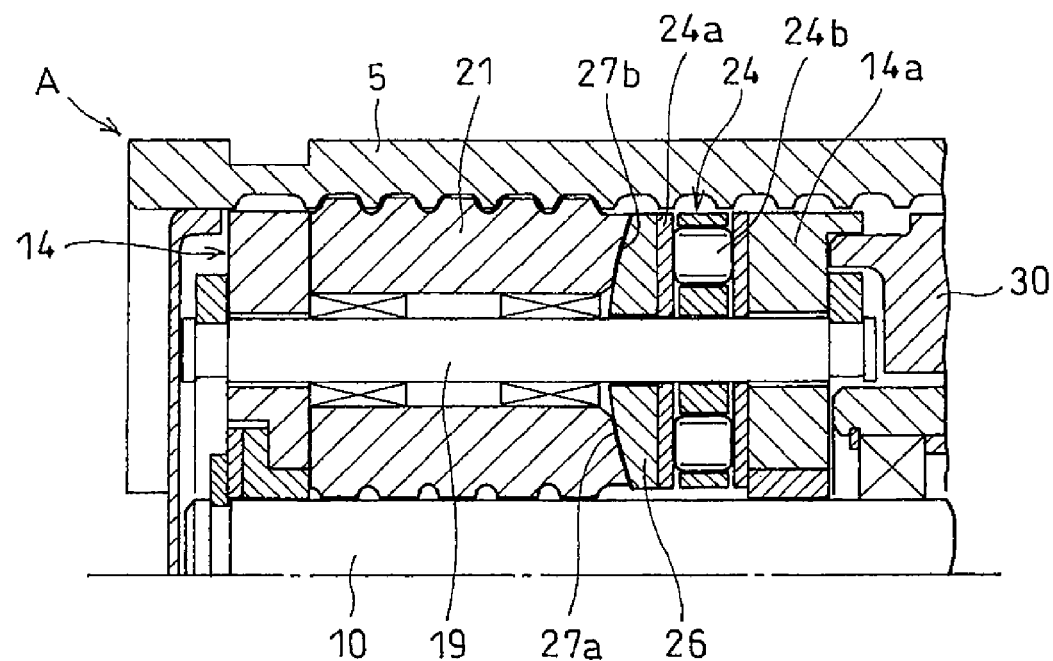
FIG. 13 is a vertical sectional view of an electric linear motion actuator according to a ninth embodiment of the present invention.

Instead of, as in the eighth embodiment of FIG. 12, forming the convex spherical surfaces 27a on the respective planetary rollers 21 and forming the concave surfaces 27b on the respective pressure-receiving seat plates 26, in the ninth embodiment shown in FIG. 13, the concave surfaces 27b is formed on the respective planetary rollers 21, and the convex spherical surfaces 27a are formed on the respective pressure-receiving seat plates 26. In this case, the pressure-receiving seat plates 26 may be formed with raceways for guiding the rolling motion of the rolling elements 24b of the respective thrust bearings 24, thereby omitting the bearing races 24a shown in FIG. 12.

If the pressure-receiving seat plates 26 have a concave spherical surface 27b as shown in FIG. 5(a), the concave spherical surface 27b has preferably a radius of curvature equal to or larger than the radius of curvature of the convex spherical surface 27a, shown in FIG. 4, to minimize the axial thickness of the pressure-receiving seat plates 26 and thus the axial length of the electric linear motion actuator.

If the pressure-receiving seat plates 26 have a tapered surface as shown in FIG. 5(b), the concave surface 27b has preferably an obtuse taper angle θ to again minimize the axial thickness of the pressure-receiving seat plates 26 and thus the axial length of the electric linear motion actuator.

FIGS. 14(a) and 14(B) show an aligning seat 27 in the form of a convex spherical surface 27a formed with radial grooves 35. FIGS. 15(a) and 15(b) show an aligning seat 27 in the form of a concave surface 27b formed with a spiral groove 35. The grooves 35 formed in the convex spherical surface 27a or the concave surface 27b as an aligning seat 27 retain lubricants (oils and fats) such as lubricating oil or grease, thus allowing smooth sliding movement between the convex spherical surface 27a and the concave surface 27b, which in turn prevents wear and seizure.

Figure 16A:
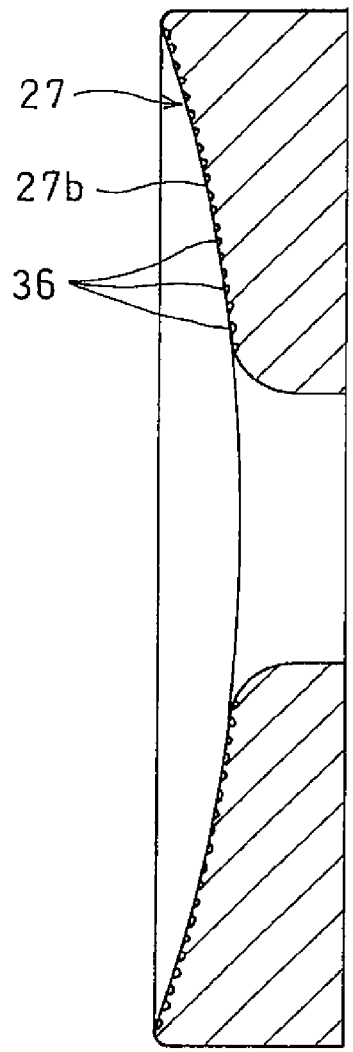
FIGS. 16(a) and 16(b) are sectional views of further different seat plates, respectively.
Figure 16B:
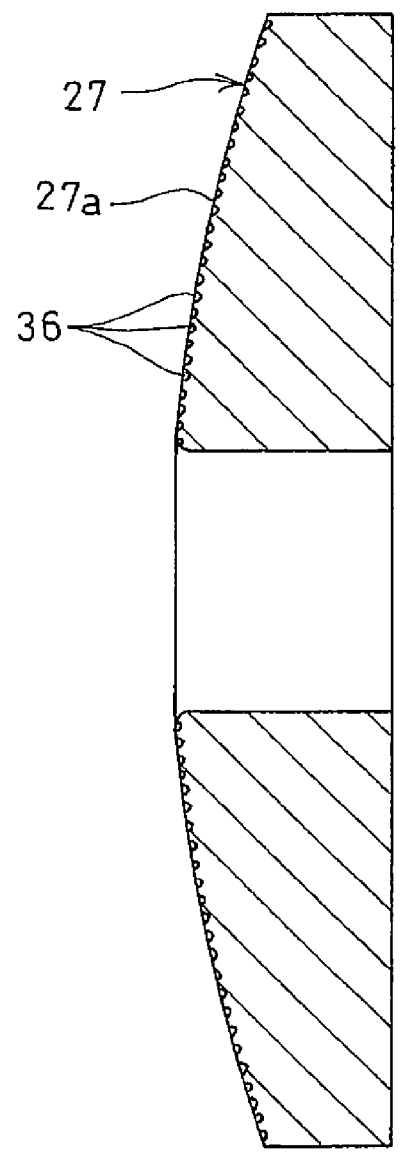

Instead of such grooves 35, as shown in FIGS. 16(a) and 16(b), innumerable independent minute recesses 36 may be formed in a random manner on the convex spherical surface 27a and/or the concave surface 27b which forms the aligning seat 27 to retain oils and fats. Further alternatively, a solid lubricant film may be formed between the convex spherical surface 27a and the concave surface 27b to lubricate the contact portions of the convex spherical surface 27a and the concave surface 27b.

Figure 17:
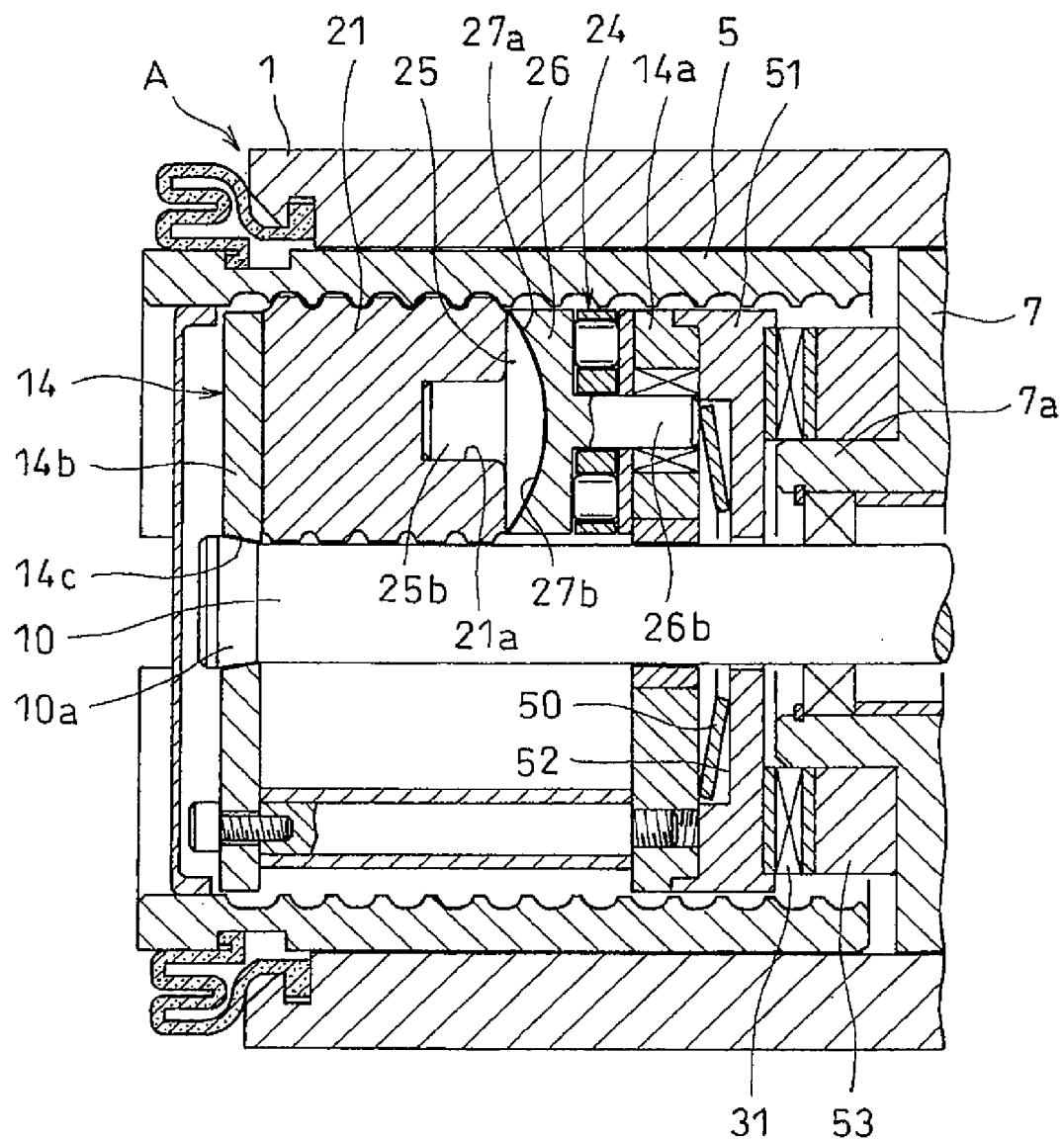
FIG. 17 is a vertical sectional view of an electric linear motion actuator according to a tenth embodiment of the present invention.

FIG. 17 shows the electric linear motion actuator according to the tenth embodiment of the present invention. In this embodiment, a pressurizing seat plate 25 formed with a convex spherical surface 27a and a pressure-receiving seat plate 26 formed with a concave spherical surface 27b are mounted between each planetary roller 21 and the corresponding thrust bearing 24. The pressurizing seat plates 25 have shaft portions 25b press-fitted in shaft inserting holes 21a formed on the first end surfaces of the respective planetary rollers 21 such that the pressurizing seat plates 25 rotate together with the respective planetary rollers 21.

The pressure-receiving seat plates 26 have shaft portions 26b rotatably supported by the respective thrust bearings 24 and the inner disk 14a of the carrier 14.

A spring holder 51 is mounted between the inner disk 14a and the boss 7a of the bearing member 7. The spring holder 51 is formed with a recess 52 in which an elastic member 50 is received. The elastic member 50 biases the carrier 14 outwardly, pressing the inner wall of a tapered hole 14c formed in the outer disk 14b against a tapered surface 10a formed on the rotary shaft 10 at its second end portion.

The concave surfaces 27b have a radius of curvature slightly larger than the radius of curvature of the convex spherical surfaces 27a. A thrust bearing 31 and a spacer 53 are mounted between the spring holder 51 and the bearing member 7.

In this embodiment, no roller shafts 19 shown in FIG. 1 are used. In this embodiment, when uneven loads are applied to the respective planetary rollers 21 from the outer ring member 5, since the concave surfaces 27b have a slightly larger radius of curvature than the convex spherical surfaces 27a, uneven loads are initially concentrated on the centers of curvature of the concave surfaces 27b of the respective pressure-receiving seat plates 26. Because the thrust bearings 24 are arranged coaxial with the respective concave surfaces 27b, the loads concentrated on the centers of curvature of the respective concave surfaces can be uniformly dispersed and uniformly applied to the respective rolling elements 24b of each thrust bearing 24 as well as its bearing race 24a, which guides the rolling elements 24b.

In the tenth embodiment, the concave surfaces 27b have a slightly larger radius of curvature than the convex spherical surfaces 27a. But they may have the same radius of curvature instead. In this case, loads are uniformly distributed to the respective rolling elements 24b and the bearing race 24a of each thrust bearing due to spherical contact between the convex spherical surface 27a and the concave surface 27b.

Figure 18:
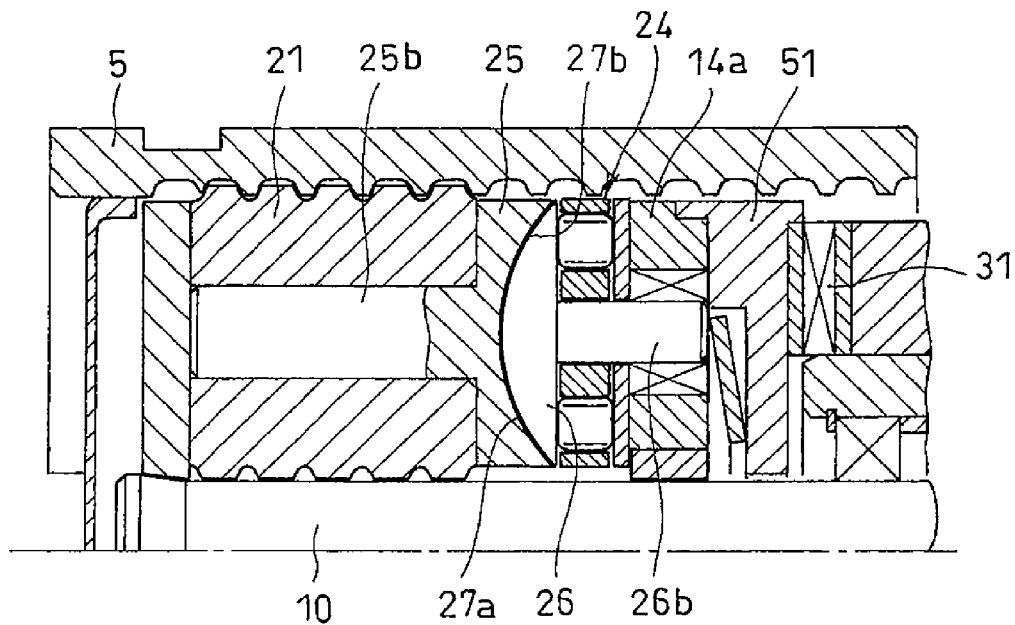
FIG. 18 is a vertical sectional view of an electric linear motion actuator according to an 11th embodiment of the present invention.

In the tenth embodiment, convex spherical surfaces 27a are formed on the pressurizing seat plates 25, which are formed with the shaft portions 25b, and concave surfaces 27b are formed on the pressure-receiving seat plates 26, which are formed with the shaft portions 26b. In the 11th embodiment shown in FIG. 18, the concave surfaces 27b are formed on the pressurizing seat plates 25, while the convex spherical surfaces 27a are formed on the pressure-receiving seat plates 26.

Figure 19:
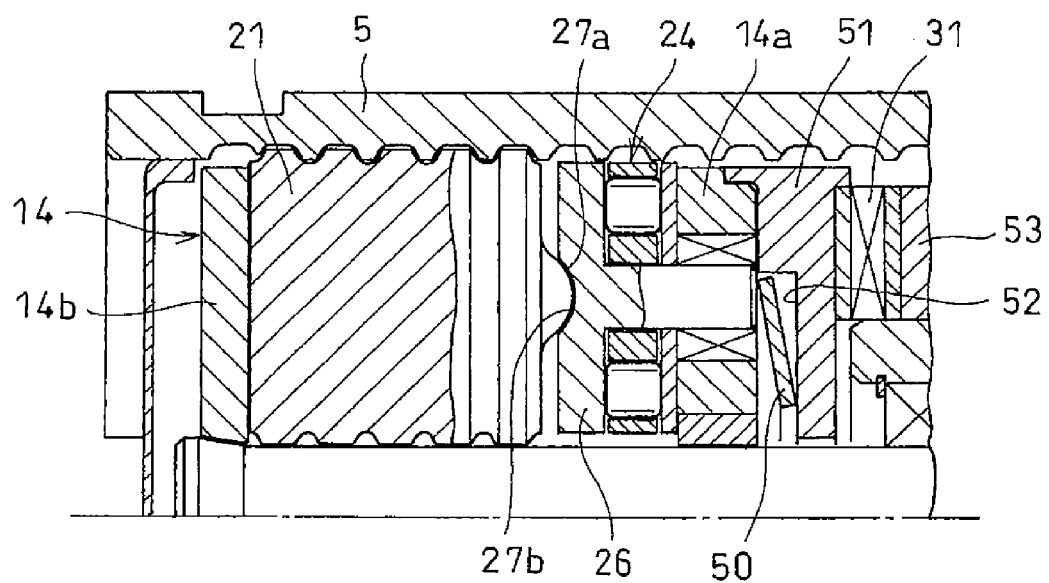
FIG. 19 is a vertical sectional view of an electric linear motion actuator according to a 12th embodiment of the present invention.

In the tenth embodiment, the pressurizing seat plates 25 are mounted to the respective planetary rollers 21, and are formed with convex spherical surfaces 27a. In the 12th embodiment shown in FIG. 19, convex spherical surfaces 27a are directly formed on the first end surfaces of the respective planetary rollers 21, thereby omitting the pressurizing seat plates 25.

In the tenth embodiment, the pressurizing seat plates 25 are mounted between the planetary rollers 21 and the thrust bearings 24, with the convex spherical surfaces 27a thereof kept in contact with the concave surfaces 27b formed on the pressure-receiving seat plates 26. In the 13th embodiment shown in FIG. 20, the pressurizing seat plates 25 are mounted between the respective thrust bearings 24 and the inner disk 14a of the carrier 14 such that the convex spherical surfaces 27a formed on the pressurizing seat plates 25 contact the concave spherical surfaces 27b formed on the inner disk 14a.

Figure 20:
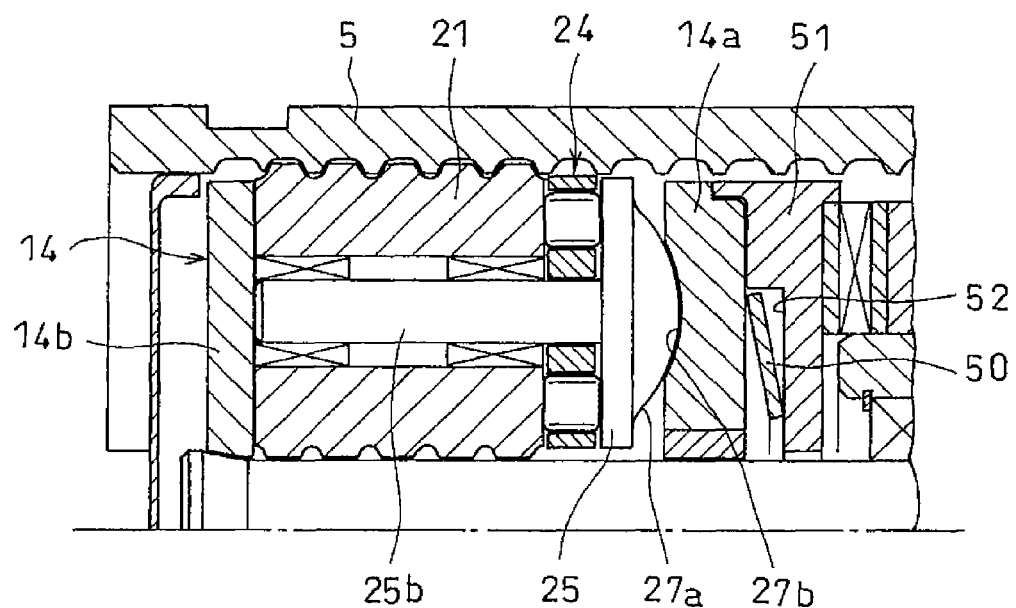
FIG. 20 is a vertical sectional view of an electric linear motion actuator according to a 13th embodiment of the present invention.

In the 13th embodiment of FIG. 20, the pressurizing seat plates 25 have shaft portions 25b rotatably supported by the respective planetary rollers 21.

In any of the first to ninth embodiments, the pressurizing seat plates 25 formed with the convex spherical surfaces 27a, the pressure-receiving seat plates 26 formed with the concave surfaces 27b such as concave spherical surfaces, and/or other members are made of steel material or sintered material because these materials are easily available and easily workable. If necessary, these members may be subjected to surface treatment such as heat treatment and/or plating treatment to improve strength, slidability and wear resistance, thus extending their lifespan and improving reliability.

What is claimed is:

1. An electric linear motion actuator comprising:
a cylindrical housing;
an outer ring member mounted in the housing;
a rotary shaft extending along a center axis of the outer ring member and configured to be rotated by an electric motor;
planetary rollers mounted between a radially outer surface of the rotary shaft and a radially inner surface of the outer ring member; and
a carrier supported by the rotary shaft so as to be rotatable about the rotary shaft and rotatably supporting the planetary rollers, the carrier including an inner disk;
wherein a helical groove or circumferential grooves are formed in a radially outer surface of each of the planetary rollers, and a helical rib is formed on the radially inner surface of the outer ring member, the helical rib being in engagement with the helical grooves or the circumferential grooves of the respective planetary rollers, wherein the rotary shaft is kept in frictional contact with the respective planetary rollers, whereby when the rotary shaft rotates, the planetary rollers are configured to rotate about respective axes of the planetary rollers while revolving around the rotary shaft, thereby moving the outer ring member in one axial direction;
wherein thrust bearings are mounted between the respective planetary rollers and the inner disk of the carrier and configured to receive an axial force applied to the respective planetary rollers from the outer ring member when the outer ring member is moved in the one axial direction;
wherein a plurality of pairs of aligning seats are provided such that each of the pairs of the aligning seats is provided between each of the planetary rollers and a corresponding one of the thrust bearings or between each of the thrust bearings and the inner disk of the carrier;
wherein each of the pairs of the aligning seats comprises a convex spherical surface and a concave surface which contacts and guides the convex spherical surface; and
wherein at least one of the convex spherical surface and the concave surface is formed with at least one groove for retaining lubricant, or a large number of independent minute recesses arranged in a random manner for retaining lubricant.

2. The electric linear motion actuator of claim 1, wherein the at least one groove comprises radial grooves or a spiral groove.

* * * * *